(12) United States Patent
Miyamoto et al.

(10) Patent No.: US 10,323,293 B2
(45) Date of Patent: Jun. 18, 2019

(54) HIGH-CARBON HOT ROLLED STEEL SHEET WITH EXCELLENT HARDENABILITY AND SMALL IN-PLANE ANISTROPY AND METHOD FOR MANUFACTURING THE SAME

(71) Applicant: JFE STEEL CORPORATION, Chiyoda-ku, Tokyo (JP)

(72) Inventors: Yuka Miyamoto, Kawasaki (JP); Takashi Kobayashi, Kawasaki (JP); Nobuyuki Nakamura, Fukuyama (JP); Yoshimasa Funakawa, Fukuyama (JP)

(73) Assignee: JFE Steel Corporation, Tokyo (JP)

( * ) Notice: Subject to any disclaimer, the term of this patent is extended or adjusted under 35 U.S.C. 154(b) by 1067 days.

(21) Appl. No.: 14/370,121

(22) PCT Filed: Dec. 25, 2012

(86) PCT No.: PCT/JP2012/008226
§ 371 (c)(1),
(2) Date: Jul. 1, 2014

(87) PCT Pub. No.: WO2013/102982
PCT Pub. Date: Jul. 11, 2013

(65) Prior Publication Data
US 2015/0000801 A1 Jan. 1, 2015

(30) Foreign Application Priority Data
Jan. 5, 2012 (JP) .................. 2012-000406

(51) Int. Cl.
| | |
|---|---|
| *C21D 9/46* | (2006.01) |
| *B21B 3/00* | (2006.01) |
| *C22C 38/00* | (2006.01) |
| *C22C 38/06* | (2006.01) |
| *C22C 38/60* | (2006.01) |
| *C22C 38/02* | (2006.01) |
| *C22C 38/04* | (2006.01) |
| *C21D 6/00* | (2006.01) |
| *C21D 8/02* | (2006.01) |
| *C22C 38/08* | (2006.01) |
| *C22C 38/22* | (2006.01) |
| *C22C 38/32* | (2006.01) |
| *B22D 11/12* | (2006.01) |
| *C21D 1/26* | (2006.01) |

(52) U.S. Cl.
CPC .................. *C21D 9/46* (2013.01); *B21B 3/00* (2013.01); *B22D 11/1206* (2013.01); *B22D 11/1213* (2013.01); *C21D 6/00* (2013.01); *C21D 8/0226* (2013.01); *C21D 8/0263* (2013.01); *C22C 38/00* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/08* (2013.01); *C22C 38/22* (2013.01); *C22C 38/32* (2013.01); *C22C 38/60* (2013.01); *C21D 1/26* (2013.01); *C21D 2211/003* (2013.01); *C21D 2211/004* (2013.01); *C21D 2211/005* (2013.01); *Y02P 10/212* (2015.11)

(58) Field of Classification Search
CPC .............................. C22C 38/04; C22C 38/06; C21D 2211/003; C21D 9/46
USPC .......................................................... 148/602
See application file for complete search history.

(56) References Cited

FOREIGN PATENT DOCUMENTS

| | | |
|---|---|---|
| EP | 2014781 | 1/2009 |
| EP | 2246450 A1 | 11/2010 |
| JP | 05-098356 A | 4/1993 |
| JP | 2001220642 | 8/2001 |
| JP | 2001220642 A * | 8/2001 |
| JP | 3233725 | 11/2001 |
| JP | 2002-129285 A | 5/2002 |
| JP | 2005-097740 A | 4/2005 |
| JP | 2005314727 | 11/2005 |
| JP | 4265582 B2 | 5/2009 |
| JP | 2010-255066 A | 11/2010 |
| JP | 2011168842 | 9/2011 |
| KR | 20100076073 A | 7/2010 |

OTHER PUBLICATIONS

International Search Report dated Mar. 26, 2013, application No. PCT/JP2012/008226.
European Search Report dated Jul. 27, 2015 in European Application No. 12864560.3.
Korean Office Action dated May 23, 2016 for Korean Application No. 2014-7021675, including Concise Statement of Relevance, 18 pages.
Korean Notice of Allowance for Korean Application No. 10-2014-7021675, dated Feb. 18, 2019, with translation, 2 pages.

\* cited by examiner

*Primary Examiner* — Weiping Zhu
(74) *Attorney, Agent, or Firm* — RatnerPrestia

(57) ABSTRACT

A high-carbon hot rolled steel sheet with excellent hardenability and small in-plane anisotropy, and a method for manufacturing the steel sheet are provided. The steel sheet has a chemical composition including, by mass %, C: 0.20 to 0.48%, Si: not more than 0.1%, Mn: not more than 0.5%, P: not more than 0.03%, S: not more than 0.01%, sol. Al: not more than 0.10%, N: not more than 0.005% and B: 0.0005 to 0.0050%, the balance including Fe and inevitable impurities. The steel sheet includes a microstructure containing ferrite and cementite. The cementite has an average grain size of not more than 1.0 μm. The steel sheet has an in-plane anisotropy of r value, Δr, of not more than 0.1 in absolute value.

18 Claims, No Drawings

HIGH-CARBON HOT ROLLED STEEL SHEET WITH EXCELLENT HARDENABILITY AND SMALL IN-PLANE ANISTROPY AND METHOD FOR MANUFACTURING THE SAME

CROSS REFERENCE TO RELATED APPLICATIONS

This is the U.S. National Phase application of PCT/JP2012/008226, filed Dec. 25, 2012, which claims priority to Japanese Patent Application No. 2012-000406, filed Jan. 5, 2012, the disclosures of each of these applications being incorporated herein by reference in their entireties for all purposes.

FIELD OF THE INVENTION

The present invention relates to high-carbon hot rolled steel sheets with excellent hardenability and small in-plane anisotropy, in particular, a small in-plane anisotropy of r value, namely Δr, (hereinafter, simply Δr), and to methods for manufacturing the same.

BACKGROUND OF THE INVENTION

Currently, automobile parts such as gears, transmissions and seat recliners are manufactured by cold working hot rolled steel sheets, which are carbon steel for machine structural use specified in JIS G 4051, into desired shapes and thereafter hardening the steel by quenching to ensure desired hardness. Thus, excellent cold workability (formability) and hardenability are required for hot rolled steel sheets that are materials. Various such steel sheets have been proposed.

For example, Patent Literature 1 discloses a hot rolled steel sheet with excellent toughness after hardening which includes, by mass %, C: 0.10 to 0.37%, Si: not more than 1%, Mn: not more than 1.4%, P: not more than 0.1%, S: not more than 0.03%, sol. Al: 0.01 to 0.1%, N: 0.0005 to 0.0050%, Ti: 0.005 to 0.05% and B: 0.0003 to 0.0050% wherein B—(10.8/14)N*≥0.0005% and N*=N−(14/48)Ti with the proviso that N*=0 when the right side ≤0, the balance being Fe and inevitable impurities, and which has an average particle size of TiN precipitate in the steel of 0.06 to 0.30 μm and a grain size of prior austenite after hardening of 2 to 25 μm.

Patent Literature 2 discloses a method for manufacturing Ti—B high-carbon steel sheets exhibiting excellent cold workability, hardenability and toughness after heat treatment, the steel sheets including, by mass %, C: 0.15 to 0.40%, Si: not more than 0.35%, Mn: 0.6 to 1.50%, P: not more than 0.030%, S: not more than 0.020%, sol. Al: 0.01 to 0.20%, N: 0.0020 to 0.012%, Ti: 0.005 to 0.1% and B: 0.0003 to 0.0030% wherein B≤0.0032 - 0.014×sol. Al−0.029×Ti, the balance being Fe and inevitable impurities.

Patent Literature 3 discloses a high-carbon hot rolled steel sheet with excellent cold workability which has a chemical composition including, by mass %, C: 0.20 to 0.48%, Si: not more than 0.1%, Mn: 0.20 to 0.60%, P: not more than 0.02%, S: not more than 0.01%, sol. Al: not more than 0.1%, N: not more than 0.005%, Ti: 0.005 to 0.05%, B: 0.0005 to 0.003% and Cr: 0.05 to 0.3% wherein Ti − (48/14)N 0.005, the balance being Fe and inevitable impurities, and which includes a microstructure having an average ferrite grain size of not more than 6 μm, an average carbide particle size of from 0.1 μm to less than 1.20 μm, and a volume fraction of substantially carbide-free ferrite grains of not more than 5%.

PATENT LITERATURE

PTL 1: Japanese Patent No. 4265582
PTL 2: Japanese Unexamined Patent Application Publication No. 5-98356
PTL 3: Japanese Unexamined Patent Application Publication No. 2005-97740

SUMMARY OF THE INVENTION

The hot rolled steel sheets described in Patent Literatures 1 to 3 exhibit excellent hardenability due to the addition of boron. However, the anisotropy Δr in these steel sheets is so large that shaping of the steel sheets into cylindrical parts such as gears, transmissions and seat recliners results in poor dimensional accuracy such as low roundness and nonuniform distribution of circumferential sheet thickness.

The present invention has an object of providing high-carbon hot rolled steel sheets having excellent hardenability and small Δr, and methods for manufacturing such steel sheets.

The present inventors studied the hardenability and Δr of B-containing high-carbon hot rolled steel sheets, finding the following.

i) Excellent hardenability is obtained by controlling the average cementite grain size to 1.0 μm or less.

ii) The anisotropy Δr needs to be not more than 0.1 in absolute value in order to avoid poor dimensional accuracy when the steel sheets are shaped into cylindrical parts such as gears, transmissions and seat recliners.

iii) With respect to i), it is effective to cool the finish rolled steel sheets to a temperature of 600° C. or below at an average cooling rate of not less than 50° C./s and coil the steel sheets at the temperature range. With respect to ii), it is effective that the steel be free from the addition of titanium, and that after the steel is finish rolled at a finishing temperature of not less than 850° C., the steel sheet be held at the Ar$_3$ transformation point +30° C. or above for at least 5 seconds and be thereafter rapidly cooled at an average cooling rate of not less than 50° C./s.

The present invention has been completed based on the above findings. The invention provides a high-carbon hot rolled steel sheet with excellent hardenability and small in-plane anisotropy, the steel sheet having a chemical composition including, by mass %, C: 0.20 to 0.48%, Si: not more than 0.1%, Mn: not more than 0.5%, P: not more than 0.03%, S: not more than 0.01%, sol. Al: not more than 0.10%, N: not more than 0.005% and B: 0.0005 to 0.0050%, the balance comprising Fe and inevitable impurities, the steel sheet including a microstructure containing ferrite and cementite, the cementite having an average grain size of not more than 1.0 μm, the steel sheet having a Δr in absolute value of not more than 0.1.

In the high-carbon hot rolled steel sheet of the invention, the chemical composition may further include, by mass %, at least one of Ni, Cr and No in a total content of not more than 1.5%, and/or at least one of Sb and Sn in a total content of not more than 0.1%.

The high-carbon hot rolled steel sheet of the invention may be manufactured by rough rolling a steel having the above chemical composition, finish rolling the steel sheet at a finishing temperature of not less than 850° C., holding the steel sheet at the Ar$_3$ transformation point +30° C. or above for at least 5 seconds, cooling the steel sheet to a temperature in the range of 600° C. and below at an average cooling rate of not less than 50° C./s, coiling the steel sheet at a temperature in the above range (i.e. 600° C. and below), and annealing the steel sheet at an annealing temperature of not more than the $Ac_1$ transformation point.

According to the present invention, high-carbon hot rolled steel sheets having excellent hardenability and small $\Delta R$ may be manufactured. The high-carbon hot rolled steel sheets of the invention are suited for cylindrical parts such as automobile gears, transmissions and seat recliners.

DETAILED DESCRIPTION OF EMBODIMENTS OF THE INVENTION

Hereinbelow, high-carbon hot rolled steel sheets and methods for manufacturing the same according to embodiments of the present invention will be described in detail. The unit "%" for the contents of components indicates "mass %" unless otherwise mentioned.

1) Chemical Composition

C: 0.20 to 0.48%

Carbon is an important element to obtain strength after hardening. In order to obtain desired hardness by heat treating steel parts manufactured by forming steel sheet, the C content needs to be at least 0.20% or more. If the C content exceeds 0.48%, however, the steel becomes hard and decreases cold workability. Thus, the C content is limited to 0.20 to 0.48%. The C content is preferably not less than 0.26% in order to obtain sufficient hardness after heat treatment.

Si: not more than 0.1%

Silicon enhances hardenability and increases hardness by solid solution strengthening. If the Si content exceeds 0.1%, however, the steel becomes hard and decreases cold workability. Thus, the Si content is limited to not more than 0.1%.

Mn: not more than 0.5%

Manganese enhances hardenability and increases hardness by solid solution strengthening. If the Mn content exceeds 0.5%, however, the steel decreases cold workability due to increase in hardness and the formation of band structure ascribed to segregation. Thus, the Mn content is limited to not more than 0.5%. Although the lower limit of the Mn content is not particularly limited, the Mn content is preferably not less than 0.2%.

P: not more than 0.03%

Phosphorus enhances hardenability and increases hardness by solid solution strengthening. If the P content exceeds 0.03%, however, grain boundary embrittlement occurs and toughness after hardening is lowered. Thus, the P content is limited to not more than 0.03%. In order to obtain excellent toughness after hardening, the P content is preferably not more than 0.02%.

S: not more than 0.01%

Sulfur forms sulfides to lower cold workability and toughness after hardening. Thus, reducing the S content is necessary. The deteriorations in cold workability and toughness after hardening become marked if the S content exceeds 0.01%. Thus, the S content is limited to not more than 0.01%. In order to obtain excellent cold workability and toughness after hardening, the S content is preferably not more than 0.005%.

Sol. Al: not more than 0.10%

If the sol. Al content exceeds 0.10%, AlN is formed during heating in the hardening treatment and the size of austenite grains becomes excessively small to promote ferrite formation during cooling, resulting in a multiple phase microstructure including ferrite and martensite. As a result, toughness after hardening is lowered. Thus, the sol. Al content is limited to not more than 0.10%, and preferably not more than 0.06%.

N: not more than 0.005%

If the N content exceeds 0.005%, the amount of solute boron is decreased by the formation of BN. Further, nitrogen present in such a content forms large amounts of BN and AlN and consequently the size of austenite grains formed during heating in the hardening treatment becomes excessively small. As a result, ferrite formation is promoted during cooling and consequently toughness after hardening is lowered. Thus, the N content is limited to not more than 0.005%. Although the lower limit of the N content is not particularly limited, the N content is preferably not less than 0.0005% because this N content ensures that BN and AlN will be formed in appropriate amounts to suppress the growth of austenite grains during heating in the hardening treatment and thereby to enhance toughness after hardening.

B: 0.0005 to 0.0050%

Boron is an important element that enhances hardenability. If the B content is less than 0.0005%, however, a sufficient hardenability enhancing effect cannot be obtained. On the other hand, more than 0.0050% boron retards austenite recrystallization after finish rolling and causes the texture of hot rolled steel sheets to be developed, resulting in $\Delta r$ exceeding 0.1 in absolute value. Thus, the B content is limited to 0.0005 to 0.0050%.

The balance is Fe and inevitable impurities. To achieve further enhancement of hardenability, the steel may further contain at least one of Ni, Cr and Mo in a total content of not more than 1.5%. Further, at least one of Sb and Sn may be added with a total content of not more than 0.1% in order to control a decrease in hardenability by decarburization and nitridation during bright hardening and carbo-nitriding.

2) Microstructure

In order to attain improved cold workability, the steel needs to have a microstructure including ferrite and cementite. Further, the average cementite grain size needs to be not more than 1.0 μm order to enhance hardenability.

Here, the average cementite grain size is obtained by a process in which a thickness cross section along the rolling direction of the steel sheet is polished and etched with nital, ten locations near the center of the sheet thickness are observed with a scanning electron microscope at a magnification of ×3000, the images are processed to determine the average cementite grain size at each location, and an average of the average grain sizes at the ten locations is calculated. By this process, the phase configuration of the microstructure may be identified at the same time.

3) $\Delta r$ in Absolute Value: Not More Than 0.1

In order for the steel sheets to be worked into cylindrical parts such as gears, transmissions and seat recliners without any problems in roundness and circumferential sheet thickness distribution, namely, with good dimensional accuracy, the $\Delta r$ in absolute value needs to be not more than 0.1.

Here, the $\Delta r$ in absolute value is measured as follows. JIS No. 5 test pieces are sampled along directions at angles of 0°, 45° and 90° to the rolling direction of the steel sheet, and the r values at the respective angles ($r_0$, $r_{45}$ and $r_{90}$) are measured in accordance with JIS Z 2254. The $\Delta r$ is calculated according to the following equation:

$$\Delta r = (r_0 + r_{90} - 2 \times r_{45})/2.$$

4) Manufacturing Conditions

Finish rolling: finishing temperature of 850° C. or above

In the manufacturing of the high-carbon hot rolled steel sheet of the invention, a steel having the aforementioned chemical composition is preferably subjected to hot rolling including rough rolling and finish rolling to give a steel sheet with a desired sheet thickness. If the finishing temperature is less than 850° C., austenite recrystallization does not proceed to a sufficient extent before the start of subsequent rapid cooling at an average cooling rate of not less than 50° C./s. Consequently, the texture of steel is developed to make it difficult to obtain Δr in absolute value of not more than 0.1. Thus, it is necessary that finish rolling be performed at a finishing temperature of not less than 850° C. The upper limit of the finishing temperature is not particularly limited. From the viewpoint of operation, however, the finishing temperature is preferably not more than 1000° C.

Treatment between finish rolling and rapid cooling: holding of steel at $Ar_3$ transformation point +30° C. or above for at least 5 seconds Even when the finishing temperature is controlled as described above, this approach alone often fails to allow austenite recrystallization to proceed sufficiently before the start of rapid cooling and thus fails to realize Δr in absolute value of not more than 0.1. In order to ensure that austenite will be sufficiently recrystallized before the start of rapid cooling and thereby to ensure that the Δr in absolute value will be not more than 0.1, it is necessary, in addition to controlling the finishing temperature as described above, that the finish rolled steel sheet be held at the $Ar_3$ transformation point +30° C. or above for at least 5 seconds. For example, the steel sheet resulting from the finish rolling may be air Cooled at the $Ar_3$ transformation point +30° C. or above for at least 5 seconds as the holding treatment.

For example, the $Ar_3$ transformation point may be determined based on a point at which a change occurs in a thermal expansion curve obtained by a experiment on Formastor with deformation device at a cooling rate of 10° C./s.

Cooling after holding at $Ar_3$ transformation point +30° C. or above for at least 5 seconds: average cooling rate of not less than 50° C./s After being held at the $Ar_3$ transformation point +30° C. or above for at least 5 seconds, the steel sheet needs to be cooled at an average cooling rate of not less than 50° C./s in order to suppress the formation of coarse pearlite during the time until coiling and thereby to ensure that cementite with an average grain size of not more than 1.0 μm will be formed during the subsequent annealing at an annealing temperature of not more than the $Ac_1$ transformation point.

Coiling temperature: not more than 600° C.

After being cooled at an average cooling rate of not less than 50° C./s, the steel sheet needs to be coiled at a coiling temperature of not more than 600° C. in order to suppress the formation of coarse pearlite after coiling and to ensure that cementite with an average grain size of not more than 1.0 μm will be formed during the subsequent annealing at an annealing temperature of not more than the $Ac_1$ transformation point. The lower limit of the coiling temperature is not particularly limited. In view of the shapes of steel sheets, however, the coiling temperature is preferably not less than 200° C.

Annealing: annealing temperature of not more than $Ac_1$ transformation point

After being coiled, the steel sheet is pickled and annealed. The annealing needs to be performed at an annealing temperature of not more than the $Ac_1$ transformation point in order to ensure that the microstructure will include ferrite and cementite without pearlite and also to ensure that the average grain size of cementite will be not more than 1.0 μm. If the annealing temperature exceeds the $Ac_1$ transformation point, austenite is formed during heating and coarse pearlite occurs during cooling, causing a decrease in hardenability. The lower limit of the annealing temperature is not particularly limited. From the viewpoint of the spheroidizing of cementite, however, the annealing temperature is preferably not less than 600° C.

For example, the $Ac_1$ transformation point may be determined based on a point at which a change occurs in a thermal expansion curve obtained by an experiment on Formastor at a heating rate of 100° C./hr.

The high-carbon steel of the invention may be smelted with any of converter furnaces and electric furnaces. The smelted high-carbon steel is rolled into a slab by ingot making-blooming or continuous casting. The slab, usually after heated, is subjected to the hot rolling. In the case of a slab produced by continuous casting, direct rolling may be adopted in which the slab is rolled directly after being cast or after being kept hot to control the temperature drop. In the case where the slab is hot rolled after being heated, the slab heating temperature is preferably not more than 1280° C. to avoid deteriorations of surface state by scales. The hot rolling may involve heating of the workpiece with a heating unit such as a sheet bar heater during hot rolling for the purpose of ensuring the finishing temperature.

EXAMPLES

High-carbon steels A to L having a chemical composition shown in Table 1 were smelted and were hot rolled under production conditions described in Table 2. Thereafter, the steel sheets were pickled and annealed at an annealing temperature of not more than the $Ac_1$ transformation point. Thus, hot rolled and annealed sheets with a sheet thickness of 3.0 mm were produced.

The hot rolled and annealed sheets manufactured above were tested by the aforementioned methods to determine the phase configuration of the microstructure, the average cementite grain size and the absolute value of Δr. Further, hardenability was evaluated by the following method.

Hardenability: Two types of methods were used to test hardenability. The first was an atmospheric hardening method in which a flat test piece (50 mm in width×50 mm in length) sampled from the steel sheet was held in an atmospheric gas that was an RX gas mixed with air such that the carbon potential would be equal to the C content in the steel, at 900° C. for 1 hour, and immediately thereafter the test piece was immersed in oil at 50° C., which was then stirred. The second was a high frequency hardening method in which a flat test piece (30 mm in width×100 mm in length) sampled from the steel sheet was heated to 900° C. in 4 seconds while moving a 100 kHz high frequency coil and was cooled with water without being held. Hardness was then measured with a Vickers hardness tester under a load of 200 gf with respect to ten points in a thickness cross section of the flat test piece at a depth of 0.1 mm from the surface layer. The results were averaged to give an average hardness (Hv). Hardenability was evaluated as excellent when the average hardness values obtained by the two testing methods satisfied the Hv conditions in accordance with the C content in the steel, shown in Table 3.

The results are described in Table 2.

The hot rolled and annealed sheets of Inventive Examples were shown to have a microstructure including ferrite and cementite, to have an average cementite grain size of not more than 1.0 μm, and to have excellent hardenability. Further, the absolute values of Δr were not more than 0.1, indicating small in-plane anisotropy. This result shows that the inventive steel sheets can give parts with high dimensional accuracy such as good roundness and uniform distribution of circumferential sheet thickness even when the steel sheets are worked into cylindrical parts such as gears, transmissions and seat recliners.

TABLE 1

(Mass %)

| Steel | C | Si | Mn | P | S | sol. Al | N | B | Others | $Ac_1$ transformation point (° C.) | $Ar_3$ transformation point (° C.) | Remarks |
|---|---|---|---|---|---|---|---|---|---|---|---|---|
| A | 0.20 | 0.02 | 0.50 | 0.02 | 0.01 | 0.03 | 0.0033 | 0.0030 | Cr: 0.1 | 719 | 752 | Inside inventive range |
| B | 0.32 | 0.02 | 0.30 | 0.02 | 0.01 | 0.03 | 0.0033 | 0.0030 | — | 720 | 721 | Inside inventive range |
| C | 0.32 | 0.02 | 0.30 | 0.02 | 0.01 | 0.03 | 0.0033 | 0.0030 | Cr: 0.5, Mo: 0.2 | 728 | 702 | Inside inventive range |
| D | 0.32 | 0.02 | 0.30 | 0.02 | 0.01 | 0.03 | 0.0033 | 0.0030 | Ni: 0.5 | 711 | 703 | Inside inventive range |
| E | 0.32 | 0.02 | 0.30 | 0.02 | 0.01 | 0.03 | 0.0033 | 0.0030 | Sb + Sn: 0.09 | 720 | 721 | Inside inventive range |
| F | 0.48 | 0.02 | 0.20 | 0.02 | 0.01 | 0.09 | 0.0033 | 0.0030 | — | 721 | 664 | Inside inventive range |
| G | 0.20 | 0.2 | 0.75 | 0.02 | 0.01 | 0.03 | 0.0033 | 0.0030 | — | 720 | 742 | Outside inventive range |
| H | 0.32 | 0.2 | 0.75 | 0.02 | 0.01 | 0.03 | 0.0033 | 0.0030 | — | 720 | 695 | Outside inventive range |
| I | 0.48 | 0.02 | 0.40 | 0.02 | 0.01 | 0.03 | 0.0033 | — | — | 719 | 651 | Outside inventive range |
| J | 0.35 | 0.01 | 0.35 | 0.02 | 0.01 | 0.04 | 0.0025 | 0.0014 | Sb + Sn: 0.02 | 720 | 705 | Inside inventive range |
| K | 0.35 | 0.01 | 0.34 | 0.02 | 0.01 | 0.04 | 0.0025 | 0.0030 | Sb: 0.01 | 719 | 706 | Inside inventive range |
| L | 0.35 | 0.02 | 0.34 | 0.02 | 0.01 | 0.04 | 0.0025 | 0.0024 | Sb: 0.007 | 719 | 706 | Inside inventive range |

TABLE 2

| | Hot rolling conditions | | | | | | | | | |
| Steel | Finishing temperature (° C.) | Holding time (s) at $Ar_3$ transformation point + 30° C. or above | Average cooling rate (° C./s) | Coiling temperature (° C.) | Annealing temperature (° C.) | Phase configuration* | Average C grain size (μm) | Δr in absolute value | Hv by high frequency annealing | Hv by atmospheric annealing | Remarks |
|---|---|---|---|---|---|---|---|---|---|---|---|
| A | 850 | 5 | 70 | 550 | 680 | F + C | 0.8 | 0.1 | 454 | 374 | Inv. Ex. |
| B | 880 | 7 | 60 | 550 | 680 | F + C | 0.7 | 0.0 | 589 | 510 | Inv. Ex. |
| B | 880 | 2 | 60 | 550 | 680 | F + C | 0.7 | 0.5 | 590 | 511 | Comp. Ex. |
| B | 810 | 7 | 60 | 550 | 680 | F + C | 0.8 | 0.4 | 585 | 503 | Comp. Ex. |
| B | 880 | 4 | 60 | 550 | 680 | F + C | 0.8 | 0.3 | 585 | 503 | Comp. Ex. |
| B | 880 | 7 | 40 | 550 | 680 | F + C | 1.3 | 0.0 | 546 | 468 | Comp. Ex. |
| B | 880 | 7 | 60 | 550 | 740 | F + C | 1.5 | 0.0 | 528 | 447 | Comp. Ex. |
| B | 880 | 7 | 60 | 630 | 680 | F + C | 1.8 | 0.0 | 499 | 418 | Comp. Ex. |
| C | 880 | 15 | 60 | 550 | 680 | F + C | 0.5 | 0.0 | 600 | 536 | Inv. Ex. |
| D | 880 | 15 | 60 | 550 | 680 | F + C | 0.6 | 0.0 | 595 | 518 | Inv. Ex. |
| E | 880 | 10 | 60 | 550 | 680 | F + C | 0.7 | 0.1 | 591 | 522 | Inv. Ex. |
| F | 900 | 15 | 50 | 550 | 680 | F + C | 0.6 | 0.1 | 744 | 665 | Inv. Ex. |
| G | 850 | 5 | 70 | 550 | 680 | F + C | 0.7 | 0.4 | 462 | 380 | Comp. Ex. |
| H | 880 | 7 | 60 | 550 | 680 | F + C | 0.6 | 0.5 | 605 | 525 | Comp. Ex. |

TABLE 2-continued

| | Hot rolling conditions | | | | | | | | | | |
|---|---|---|---|---|---|---|---|---|---|---|---|
| Steel | Finishing temperature (° C.) | Holding time (s) at Ar₃ transformation point + 30° C. or above | Average cooling rate (° C./s) | Coiling temperature (° C.) | Annealing temperature (° C.) | Phase configuration* | Average C grain size (μm) | Δr in absolute value | Hv by high frequency annealing | Hv by atmospheric annealing | Remarks |
| I | 900 | 15 | 50 | 550 | 680 | F + C | 0.6 | 0.2 | 639 | 560 | Comp. Ex. |
| J | 860 | 10 | 60 | 590 | 710 | F + C | 0.7 | 0.1 | 620 | 533 | Inv. Ex. |
| K | 850 | 10 | 60 | 590 | 710 | F + C | 0.5 | 0.1 | 624 | 535 | Inv. Ex. |
| L | 850 | 10 | 60 | 590 | 710 | F + C | 0.7 | 0.1 | 615 | 531 | Inv. Ex. |

*F: Ferrite, C: Cementite

TABLE 3

| C content (mass %) | Hv by high frequency annealing | Hv by atmospheric annealing |
|---|---|---|
| 0.20 | ≥440 | ≥360 |
| 0.32 | ≥580 | ≥500 |
| 0.35 | ≥600 | ≥530 |
| 0.48 | ≥730 | ≥650 |

The invention claimed is:

1. A high-carbon hot rolled steel sheet with excellent hardenability and small in-plane anisotropy, the steel sheet having a chemical composition including, by mass %, C: 0.20 to 0.48%, Si: not more than 0.1%, Mn: not more than 0.5%, P: not more than 0.03%, S: not more than 0.01%, sol. Al: not more than 0.10%, N: not more than 0.005% and B: 0.0005 to 0.0050%, the balance comprising Fe and inevitable impurities, the chemical composition free from addition of Ti, the steel sheet comprising a microstructure including ferrite and cementite, the cementite having an average grain size of not more than 1.0 μm, the steel sheet having an in-plane anisotropy of r value, Δr, of not more than 0.1 in absolute value.

2. The hot rolled steel sheet according to claim 1, wherein the chemical composition further includes, by mass %, at least one selected from the group consisting of NI, Cr and Mo in a total content of not more than 1.5%.

3. The hot rolled steel sheet according to claim 2, wherein the C content is 0.26 to 0.48%.

4. The hot rolled steel sheet according to claim 2, wherein the chemical composition further includes, by mass %, at least one selected from the group consisting of Sb and Sn in a total content of not more than 0.1%.

5. The hot rolled steel sheet according to claim 4, wherein the C content is 0.26 to 0.48%.

6. The hot rolled steel sheet according to claim 1, wherein the chemical composition further includes, by mass %, at least one selected from the group consisting of Sb and Sn in a total content of not more than 0.1%.

7. The hot rolled steel sheet according to claim 6, wherein the C content is 0.26 to 0.48%.

8. The hot rolled steel sheet according to claim 1, wherein the C content is 0.26 to 0.48%.

9. The hot rolled steel sheet according to claim 1, wherein the Mn content is 0.2 to 0.5%.

10. The hot rolled steel sheet according to claim 1, wherein the P content is not more than 0.02%.

11. The hot rolled steel sheet according to claim 1, wherein the S content is not more than 0.005%.

12. The hot rolled steel sheet according to claim 1, wherein the sol. Al content is not more than 0.06%.

13. The hot rolled steel sheet according to claim 1, wherein the N content is 0.0005 to 0.005%.

14. A method for manufacturing high-carbon hot rolled steel sheets with excellent hardenability and small in-plane anisotropy, comprising rough rolling a steel having the chemical composition described in claim 1, finish rolling the steel sheet at a finishing temperature of not less than 850° C., holding the steel sheet at the Ar₃ transformation point +30° C. or above for at least 5 seconds, cooling the steel sheet to a temperature in the range of 600° C. and below at an average cooling rate of not less than 50° C./s, coiling the steel sheet at a temperature in the above range, and annealing the steel sheet at an annealing temperature of not more than the Ac₁ transformation point, the steel sheet comprising a microstructure including ferrite and cementite, the cementite having an average grain size of not more than 1.0 μm, the steel sheet having an in-plane anisotropy of r value, Δr, of not more than 0.1 in absolute value.

15. The method according to claim 14, wherein the annealing temperature is not less than 600° C. and not more than the Ac₁ transformation point.

16. The method for manufacturing high-carbon hot rolled steel sheets according to claim 14, wherein the steel further includes, by mass %, at least one selected from the group consisting of Sb and Sn in a total content of not more than 0.1%.

17. The method for manufacturing high-carbon hot rolled steel sheets according to claim 14, wherein the steel further includes, by mass %, at least one selected from the group consisting of Ni, Cr and Mo in a total content of not more than 1.5%.

18. The method for manufacturing high-carbon hot rolled steel sheets according to claim 17, wherein the steel further includes, by mass %, at least one selected from the group consisting of Sb and Sn in a total content of not more than 0.1%.

* * * * *